US006829354B1

(12) United States Patent
Enriquez

(10) Patent No.: US 6,829,354 B1
(45) Date of Patent: Dec. 7, 2004

(54) BIASING ARRANGEMENT FOR OPTIMIZING DC FEED CHARACTERISTICS FOR SUBSCRIBER LINE INTERFACE CIRCUIT

(75) Inventor: Leonel Ernesto Enriquez, Melbourne Beach, FL (US)

(73) Assignee: Intersil Corporation, Palm Bay, FL (US)

( * ) Notice: Subject to any disclaimer, the term of this patent is extended or adjusted under 35 U.S.C. 154(b) by 564 days.

(21) Appl. No.: 09/686,926

(22) Filed: Oct. 11, 2000

(51) Int. Cl.[7] .......................... H04M 1/00; H04M 9/00; H04M 9/08

(52) U.S. Cl. ................... 379/413; 379/399.01

(58) Field of Search ............................. 379/399.01, 413

(56) References Cited

U.S. PATENT DOCUMENTS

| | | | |
|---|---|---|---|
| 4,091,333 A | 5/1978 | Thrap | 330/100 |
| 4,336,502 A | 6/1982 | Goto | 330/253 |
| 4,558,287 A | 12/1985 | Tanaka | 330/257 |
| 5,210,506 A | 5/1993 | Koch et al. | 330/255 |
| 5,357,210 A | 10/1994 | Miljanic et al. | 330/151 |
| 5,640,128 A | 6/1997 | Wilhelm | 330/308 |
| 5,671,272 A | 9/1997 | Cotreau | 379/382 |
| 5,929,623 A | 7/1999 | Hoshino | 330/257 |
| 6,028,482 A | 2/2000 | Herrle | 330/282 |
| 6,154,094 A | 11/2000 | Seven | 330/257 |
| 6,292,033 B1 | 9/2001 | Enriquez | 327/89 |
| 6,301,358 B1 * | 10/2001 | Chen et al. | 379/413 |

FOREIGN PATENT DOCUMENTS

| | | | | |
|---|---|---|---|---|
| JP | 407007337 A | 1/1995 | | H03F/3/34 |
| JP | 408018398 A | 1/1996 | | H03F/1/34 |

* cited by examiner

Primary Examiner—Curtis Kuntz
Assistant Examiner—Alexander Jamal
(74) Attorney, Agent, or Firm—Allen, Dyer, Doppelt Milbrath & Gilchrist, P.A.

(57) ABSTRACT

A subscriber line interface circuit (SLIC) drive arrangement controllably adjusts DC biasing and overhead voltage characteristics for wireline pair that is optimized for each mode of operation of the SLIC. Respective tip and ring DC drive voltages supplied by tip and ring drive amplifiers are controlled so that the differential DC voltage across the wireline pair has a first constant value during on-hook mode, in which DC loop current may vary between zero and a first DC loop current threshold value associated with a transition from on-hook mode toward off-hook mode. During a transition between on-hook mode and off-hook mode, the tip and ring DC drive voltages are controlled so as to vary the differential DC drive voltage in proportion to monitored DC loop current. During off-hook mode, the differential DC voltage is set at a second fixed value. If an upper DC loop current threshold is reached during off-hook mode, the differential DC voltage is sharply reduced from its second constant value.

9 Claims, 2 Drawing Sheets

BIASING ARRANGEMENT FOR OPTIMIZING DC FEED CHARACTERISTICS FOR SUBSCRIBER LINE INTERFACE CIRCUIT

CROSS REFERENCE TO RELATED APPLICATIONS

The present invention relates to subject matter disclosed in co-pending U.S. patent application Ser. No. 09/639,408, "Transconductance Amplifier Circuit," by L. Enriquez, filed Aug. 14, 2000, (hereinafter referred to as the '408 application), and co-pending U.S. patent application, Ser. No. 09/686,505, by L. Enriquez, entitled: "Precision, Low-Power Current-Sense Transmission Channel for Subscriber Line Interface Circuit, Programmable with Single Ended Impedances and Capable of Exhibiting a Voltage Sense Response," filed Oct. 11, 2000 (hereinafter referred to as the '505 application), both applications being assigned to the assignee of the present application, and the disclosures of which are incorporated herein.

FIELD OF THE INVENTION

The present invention relates in general to communication systems and components, and is particularly directed to a circuit arrangement for controllably adjusting DC biasing and overhead voltage characteristics for a subscriber line interface circuit (SLIC), in a manner that is optimized for the mode of operation of the SLIC.

BACKGROUND OF THE INVENTION

In order to facilitate interfacing with a variety of telecommunication circuits, including those providing digital codec functionality, the subscriber line interface circuits, or SLICs, employed by telecommunication service providers must comply with a demanding set of performance requirements including accuracy, linearity, insensitivity to common mode signals, filtering, low power dissipation, low noise, and ease of impedance matching programmability. In addition, for different installations, the length of the wireline pair to which the SLIC is connected is not only expected to vary, but may be very significant (e.g., on the order of multiple miles); this wireline pair transports both substantial DC voltages, as well as AC signals (e.g., voice and/or ringing). As a consequence, it has been difficult to realize a SLIC implementation that has 'universal' use in both legacy and state of the art applications.

Advantageously, the SLIC transmission channel described in the above-referenced '505 application effectively realizes these objectives by the combination of a front end, current-sensing transimpedance stage coupled in cascade with a transconductance amplifier-configured filter/gain output stage. The front end transimpedance stage is coupled to respective tip and ring portions of a telecommunication wireline pair, and is operative to transform differentially sensed tip and ring input currents into a precise, single ended voltage. This voltage is converted by the transconductance amplifier-based filter/gain output stage into a very precise, single ended output current, which is then transformed into as a single ended output voltage for application to a current-sense, voltage feed-feed telecommunication circuit. In addition, the transmission channel of the '505 application is configured to have its passband for AC signals programmable by means of a single external reactance component (capacitor); also, the output impedance it presents to the line is programmable by means of only one programming pin.

Because a SLIC is required to perform a variety of signal-coupling and conditioning tasks, including DC biasing of an associated telephone circuit, as well as providing the appropriate overhead voltage on the wireline pair, as described above, design of the SLIC is critical to power management and signal transport fidelity. For example, too low an overhead voltage across the tip and ring pair can result in insufficient signal amplitude headroom, which may lead to unwanted clipping of the AC (voice) signals being transmitted through the subscriber loop. On the other hand, an excessive overhead voltage could result in not enough current to bias a telephone connected to a long loop.

SUMMARY OF THE INVENTION

In accordance with the present invention, these concerns are successfully addressed by means of a new and improved DC biasing circuit architecture that is configured to controllably set the differential DC voltage characteristic of a tip-ring loop driven by a subscriber line interface circuit (SLIC), in a manner that is optimized for the mode of operation of the telephone circuit. Such modes of operation include on-hook, open circuit mode, in which the subscriber's phone is disconnected; on-hook, quiescent mode, in which the SLIC is minimally active, such as for the purpose of monitoring the line for a data transmission (such as caller ID); transition mode, where the subscriber is in the process of going off-hook and placing a call; and off-hook mode, where the SLIC is in its active call (voice transmission) mode. These respective modes of operation require different dynamic ranges of overhead voltage, while supplying the current required for proper biasing of the wireline pair.

Pursuant to the invention, the DC feed characteristics of the SLIC are controllably optimized by monitoring the differential DC tip-ring loop current, via sense resistors in the output paths of respective tip and ring output amplifiers driving the tip and ring conductors of the wireline pair of interest. The sense resistors have values several orders in magnitude smaller than the values of the feedback resistors of the tip and ring output amplifiers.

The magnitude of a DC tip voltage applied to the tip conductor is determined by the product of the value of the tip amplifier's feedback resistor and a controllably adjustable tip bias current injected therethrough. In a similar manner, the magnitude of a DC ring voltage applied to the ring conductor is determined by the product of the value of the ring amplifier's feedback resistor and a controllably adjustable ring bias current injected through the ring amplifier's feedback resistor. The values of these tip and ring DC bias currents are controllably established so as to provide a differential DC voltage Vtr between the tip and ring terminals having the required overhead voltage (relative to ground and to battery, respectively), and supply the necessary DC current required to bias the phone at the far end of the loop which, as noted above, may be more than several miles away.

In order to appropriately set the values of the tip and ring bias currents, the loop currents flowing through the tip and ring sense resistors are differentially coupled to a transimpedance circuit of the type employed in transimpedance stage of the SLIC transmission channel described in the above-referenced '505 application may be employed. This transimpedance stage transforms the differentially sensed tip and ring input currents into a precise, single ended voltage that is applied to a transconductance amplifier stage.

The AC and DC components of the differentially sensed loop current are separated by an RC (resistor-capacitor)

passband filter coupled with a transconductance amplifier stage to which a summation voltage from the transimpedance amplifier is applied. The DC voltage component across the passband filter capacitor is coupled to an absolute value circuit, which produces first and second current components representative of the absolute value of the dc component of the loop current, and scaled by a prescribed factor. The first current component is coupled to a first comparator circuit to which first and second (scaled) threshold currents ITH1 and ITH2 are applied. The second current component is coupled to a second comparator, to which a third threshold current ILIM is applied.

As will be described, the first current threshold ITH1 corresponds to a dc loop current greater than the leakage currents which may be encountered in the subscriber line, and associated with a transition in the operation of the phone from an on-hook, quiescent mode to an active off-hook, call (voice signal transmission) mode. The second current threshold ITH2 corresponds to a higher valued dc loop current associated with the completion of the transition in the operation of the phone from the on-hook mode to the active off-hook mode. The third threshold ILIM corresponds to an upper dc loop current threshold greater than the second loop current threshold ITH2, and associated with the upper end of the active off-hook mode.

In accordance with the operation of the first comparator, as long as the first current component produced by the absolute value circuit is less than the first threshold current ITH1, the comparator supplies a first output current I1=0 over a first current path. On is the other hand, if the first current component is equal to or greater than the first threshold, the value of the comparator's first output current I1 is proportional to the difference between the first current component produced by the absolute value circuit and the first dc loop current threshold value.

A second current path from a first current mirror to the first comparator provides a second output current I2 as follows. If the first current I1 produced by the first comparator is less than the second threshold current value ITH2, then the second current I2 is equal to the sum of the first threshold current and the first current I1. However, if the first current I1 is equal to or greater than the second threshold current value, the second current I2 is equal to the sum of the first and second threshold currents ITH1 and ITH2.

A second port of the first current mirror is coupled to an external reference resistor (RDC). The mirrored voltage across the reference resistor is coupled to a unity gain buffer, the output of which controls the current applied to a second current mirror. This current is mirrored at a (1:1) current mirror port and a (2:1) current mirror port of the second current mirror. The (1:1) current mirror port is injected through the tip amplifier feedback resistor, so that a fixed tip bias voltage based on the second current I2 is applied to the tip conductor. An additional, a relatively small tip path overhead current from an auxiliary current source is supplied through the tip amplifier's feedback resistor.

The (2:1) current mirror port of the second current mirror couples a second mirrored current to a common node point between a pair of equal valued resistors. One of these resistors is coupled to a virtual ground circuit; the other resistor is coupled to a power supply or battery terminal VBAT. A auxiliary current source also supplies a relatively small valued ring path DC bias current to this common node. In addition, this common node is coupled to receive a mirrored current from a third current mirror, a first current mirror port of which is coupled to receive a current I3 from the second comparator, to which the second current component from the absolute value circuit is coupled.

Similar to the node connection for the first threshold current value to the first comparator, if the second current component produced by the absolute value circuit is less than the third (upper limit) threshold current ILIM, the value of the third current I3 is set equal to zero. On the other hand, if the magnitude of the second current component from the absolute value circuit is equal to or greater than the upper limit threshold current value ILIM, the third current I3 produced by the second comparator is proportional to the difference between the second current component and the upper limit threshold current ILIM.

The virtual ground device has an associated current generator which mirrors a current through one of the pair of equal valued, common node-connected resistors through the feedback resistor of the ring output amplifier. As a result, the DC voltage drop across the ring amplifier's feedback resistor varies in accordance with the mode of operation of the SLIC. When differentially combined with the DC voltage drop across the tip amplifier's feedback resistor, the tip-ring output voltage Vtr varies in an optimum relationship to DC loop current.

In particular, as long as the DC loop current is less than the first dc loop current threshold ITH1, tip-ring voltage Vtr is equal to a first fixed offset voltage value plus ITH1*RDC below the battery voltage VBAT. Once the first dc current threshold ITH1 is reached, then as long as the loop current remains less than the second threshold, the voltage Vtr transitions along a non-zero slope segment from its value at the first threshold point. When the loop current reaches the second threshold point, Vtr acquires a second fixed value which is defined to provide a prescribed amount of signal amplitude headroom relative to the battery voltage in order to avoid clipping of the AC signal. When the loop current reaches the upper limit ILIM, the differential voltage Vtr rapidly drops to zero along a very steep slope.

DETAILED DESCRIPTION

Figure 1:
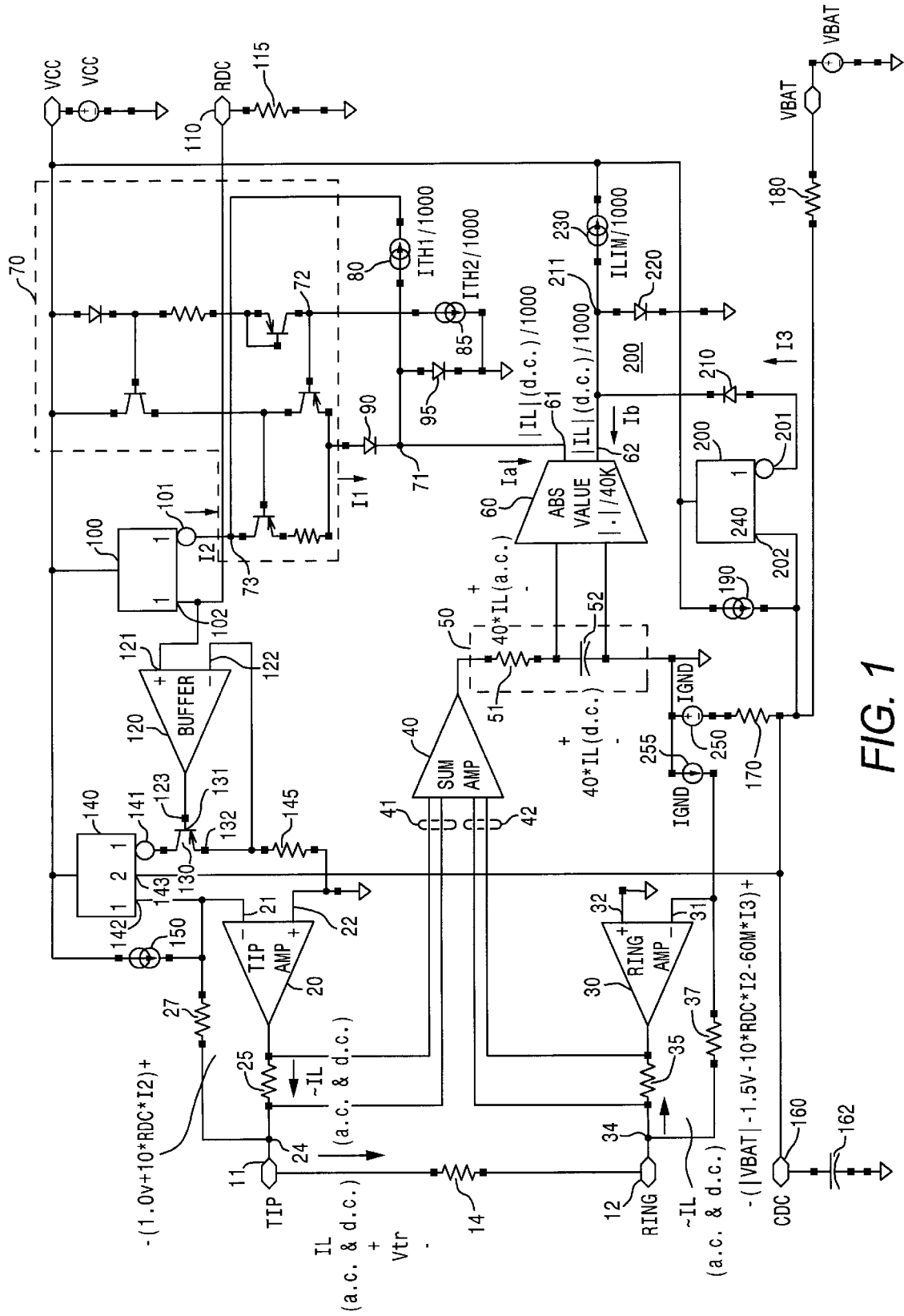
FIG. 1 diagrammatically illustrates the circuit architecture of the DC biasing arrangement for optimizing the DC feed characteristics of a subscriber line interface circuit, in accordance with a non-limiting, but preferred embodiment of the present invention.

The overall architecture of the DC biasing arrangement of the invention for controllably optimizing the DC bias for and overhead voltage provided to a driven wireline pair by a subscriber line interface circuit (SLIC) is shown in FIG. 1. The wireline pair comprises respective tip and ring conductors 11 and 12 that are terminated by a subscriber telephone circuit load, denoted as a load resistor 14 having a resistance value RL. Subscriber loop current IL through the wireline pair contains a dc component and an ac component and produces a differential tip-ring voltage Vtr across loop circuit load resistor 14.

The wireline pair is driven by means of respective tip and ring output amplifiers 20 and 30, that are coupled through tip and ring sense resistors 25 and 35 (having relatively low resistance values Rs (on the order of several tens of (e.g., Rs=20) ohms) to tip and ring output ports 24 and 34 bridging the tip and ring conductors 11 and 12 of the wireline pair. Pursuant to a non-limiting, but preferred embodiment, tip and ring amplifiers 20 and 30 may correspond to the respective tip and ring output amplifiers employed in the transconductance amplifier-based line-driving stages of the transmission channel described in the above-referenced '408 and '505 applications.

The relatively small valued (20 ohm) sense resistors 25 and 35 are several orders in magnitude smaller than the values (e.g., on the order of 500 Kohms) of feedback resistors 27 and 37, installed between the output ports 24 and 34 of the tip and ring output amplifiers and their respective inverting (−) inputs 21, 31. Respective non-inverting (+) inputs 22 and 32 of the tip and ring amplifiers 20 and 30 are coupled to a reference voltage (e.g., ground (GND)).

A DC tip voltage $VDC_{24}$ presented to the tip port 24 is determined by the product of the value of the tip amplifier feedback resistor 27 and a controllably adjustable tip bias current Ibias_tip supplied through feedback resistor 27. Similarly, a DC ring voltage $VDC_{34}$ presented to the ring port 34 is determined by the product of the value of the ring amplifier's feedback resistor 37 and a controllably adjustable ring bias current Ibias_ring supplied through the ring amplifier's feedback resistor 37.

As described briefly above, and as will be detailed below, the values of the currents Ibias_tip and Ibias-ring are controllably set so as to provide a differential DC voltage Vtr between the tip and ring terminals having the required overhead voltage (relative to ground and to battery, respectively), and supply the necessary DC current required to bias the phone at the far end of the loop, which may be more than several miles away.

In order to appropriately set the values of the tip and ring bias currents Ibias_tip and Ibias-ring, a summation of the differential loop currents flowing through the tip and ring sense resistors 25 and 35 is monitored. For this purpose, and pursuant to a preferred, but non-limiting embodiment, a transimpedance circuit of the type employed in transimpedance stage of the SLIC transmission channel described in the above-referenced '505 application may be employed. In order to reduce the complexity of FIG. 1, this transimpedance stage has been illustrated as a differential summing-amplifier-stage 40, differential input ports 41 and 42 of which are coupled across the tip and ring sense resistors 25 and 35. This differential sensing transimpedance stage is operative to transform the differentially sensed tip and ring input currents flowing through the tip and ring sense resistors into a precise, single ended voltage that is applied to a transconductance amplifier stage.

Separation of the AC and DC components of the differentially sensed loop current in the transmission channel detailed in the above-referenced '505 application is effected by means of a passband filter coupled to ground, as shown at 50 in FIG. 1, at the input of a transconductance amplifier stage to which the summation voltage from the transimpedance amplifier is applied. This filter network 50 is comprised of a resistor 51 and a capacitor 52, which sum the respective AC and DC components of the voltage drops across the sense resistors 25 and 35, as a result of the tip and ring loop currents IL therethrough.

The DC voltage component (2Rs*IL) across the capacitor 52 is coupled to an absolute value circuit 60, having respective output ports 61 and 62, which produce currents Ia and Ib representative of the dc component of the load current, and scaled by a prescribed factor (e.g., 1/1000). Thus, in the present example, Ia=Ib=ILdc/1000.

The output current Ia at output port 61 is coupled to a first node 71 of a comparator circuit 70, which is coupled to receive a first (scaled) reference or threshold current ITH1/1000, supplied by a first current generator 80. Comparator circuit 70 has a second node 72 coupled to receive a second (scaled) reference or threshold current ITH2/1000, supplied by a second current generator 85. As will be described below with reference to FIG. 2, the first current threshold ITH1 corresponds to a loop current greater than the leakage current expected in the line, and associated with a transition in the operation of the phone from an on-hook, quiescent mode to an active off-hook, call (voice signal transmission) mode. The second current threshold ITH2 corresponds to a higher valued loop current associated with the completion of the transition in the operation of the phone from on-hook mode to the active off-hook mode.

A diode 90 of a first current path I1 from the comparator circuit 70 is further coupled to the node 71, which is further coupled through a diode 95 to ground. As can be seen from this node connection, if the output current Ia (ILdc/1000) is less than the first threshold current ITH1/1000, then no current is drawn through the diode 90, so that I1=0. On the other hand, if the output current Ia is equal to or greater than the first threshold current ITH1/1000, a current I1 will flow through diode 90 to the node 71 in proportion to the difference between current Ia and the first threshold current ITH1/1000. Namely, I1=Ia−ITH1/1000.

A second current path I2 from a first port 101 of a first (1:1) current mirror circuit 100 is coupled to a third node 73 of the comparator circuit 70. Node 73 is further coupled to the first current generator 80. The magnitude of the second current through the second current path I2 is defined as follows. If the first current I1 is less than the second threshold current ITH2/1000, then the second current I2 is equal to the sum of the first threshold current ITH1/1000 and the current I1. Namely, I2=ITH1/1000+I1. However, if the first current I1 is equal to or greater than the second threshold current ITH2/1000, then the second current I2 is equal to the sum of the first and second threshold currents ITH1/1000 and ITH2/1000. Namely, I2=ITH1/1000+ITH2/1000.

From the foregoing relationships, the following conditions may be defined:

I2=ITH1/1000, for Ia less than ITH1/1000 (1);

I2=Ia, for ITH1/1000+ITH2/1000 greater than Ia, and Ia greater than or equal to ITH1/1000; and I2=ITH1/1000+ITH2/1000, for Ia greater than or equal to ITH1/1000+ITH2/1000.

A second port 102 of the first (1:1) current mirror circuit 100 is coupled to a DC reference terminal 110, to which a grounded external reference resistor 115 having a resistance value of RDC is coupled. Since port 102 mirrors the current I2, the voltage drop across resistor 115 is RDC*I2. This voltage is coupled to a first, non-inverting (+) terminal 121 of a unity gain buffer 120. Buffer 120 has its output 123 coupled to the base 131 of an NPN bipolar transistor 130, the collector-emitter path of which is coupled in circuit with a first port 141 of a second current mirror 140 and a resistor 145 (having a resistance value R145=50K) to ground. Transistor 130 has its emitter 132 coupled to the inverting (−) input 122 of buffer 120. With this connection, the current I130 flowing through the collector-emitter path of transistor 130, and therefore to the first port 141 of the current mirror 140 may be defined as:

I130=I2*RDC/R145.

This current I130 is mirrored by current mirror 140 at a (1:1) current mirror port 142 and a (2:1) current mirror port 143. The (1:1) current mirror port 142 is coupled to the inverting input (−) 21 of the tip amplifier 20, and to the (500 Kohm) feedback resistor 27. An additional tip path overhead current IT-OVH (e.g., on the order of 2 microamps) is supplied through the feedback resistor 27 by way of a current source 150. As a consequence, the total DC bias current I27 flowing through feedback resistor 27 to the tip port 24 may be defined as:

I27=IT-OVH+I130=IT-OVH+I2*RDC/R145.

For the non-limiting parameters of the present example (R27=500 Kohms, R145=50 Kohms, and IT_OVH=2 μA), the voltage drop V27 across resistor 27 may be expressed as:

V27=(2 μA*500Kδ+500Kδ/50Kδ*RDC*I2) volts, or

V27=(1V+10RDC*I2) volts, as shown parenthetically beneath the feedback resistor 27.

The (2:1) current mirror port 143 of current mirror 140 couples a current of 2*I130 to a CDC node 160, to which a grounded capacitor 162 is coupled, and which is a common node point between equal valued (e.g., 250 Kohm) resistors 170 and 180. Resistor 170 is coupled to a virtual ground circuit 250, while resistor 180 is coupled to a battery terminal VBAT.

A current source 190 supplies a relatively small valued (e.g., on the order of 6 μA) ring path DC bias current 2*IR_OVH to node 160. In addition, node 160 is coupled to receive a mirrored current 240*I3 from a current mirror port 202 of a (240:1) current mirror 200. A first current mirror port 201 of current mirror 200 is coupled to receive a current I3 via a diode 210 coupled to the Ib output port 62 of absolute value circuit 60.

The output port 62 is coupled to a node 211 of a comparator 200, having a diode 220 coupled to ground and a current source 230 supplying a third, scaled upper limit threshold current ILIM/1000. As will be described below with reference to FIG. 2, the third threshold ILIM corresponds to an upper loop current threshold greater than the second loop current threshold ITH2, and associated with the upper end of the active off-hook mode.

Similar to the node connection for the first threshold current source ITH1/1000 in comparator 70, if the output current Ib (ILdc/1000) is less than the third (upper limit) threshold current ILIM/1000, then no current is drawn through the diode 210, so that I3=0. On the other hand, if the output current Ib is equal to or greater than the threshold current ILIM/1000, a current I3 will flow through diode 210 in proportion to the difference between current Ib and the upper limit threshold current ILIM/1000. Namely, I3=Ib−ILIM/1000.

The respective currents I170 and I180 through the resistors 170 and 180 may be defined as follows:

I170=|VBAT|/(R170+R180)−I130−IR_OVH−120*I3;
I180=|VBAT|/(R170+R180)−I130−IR_OVH+120*I3.

The current I170 through resistor 170 may be rewritten as:

I170=|VBAT|/(R170+R180)−I2*RDC/R145−IR_OVH−120*I3.

This current flowing through resistor 170 is coupled to a virtual ground device 250, having an associated current generator 255 which mirrors the current I170 through the feedback resistor 37 of the ring output amplifier 30. As a result, the DC voltage drop V37 across the resistor 37 may be expressed as:

V37=|VBAT|*R37/(R170+R180)R37/R145*RDCI2−R37*IR_OVH−120*R37*I3.

For the parameters of the present example, since the value R37 (500Kδ) of feedback resistor 37 is equal to the sum of the values of resistors 170 and 180 (R170=R180 =250Kδ) and equal to ten times the value (R145=50Kδ), and IR_OVH=3 μA, then V37 may be defined as:

V37=(|VBAT|−10*RDC*I2−1.5−60M*I3) volts.

But V27+Vtr−V37=0.

Therefore,

Vtr=|VBAT|−1.5−10*RDC*I2−60M*I3−1, or

Vtr=|VBAT|−2.5−20*RDC*I2−60M*I3.

Figure 2:
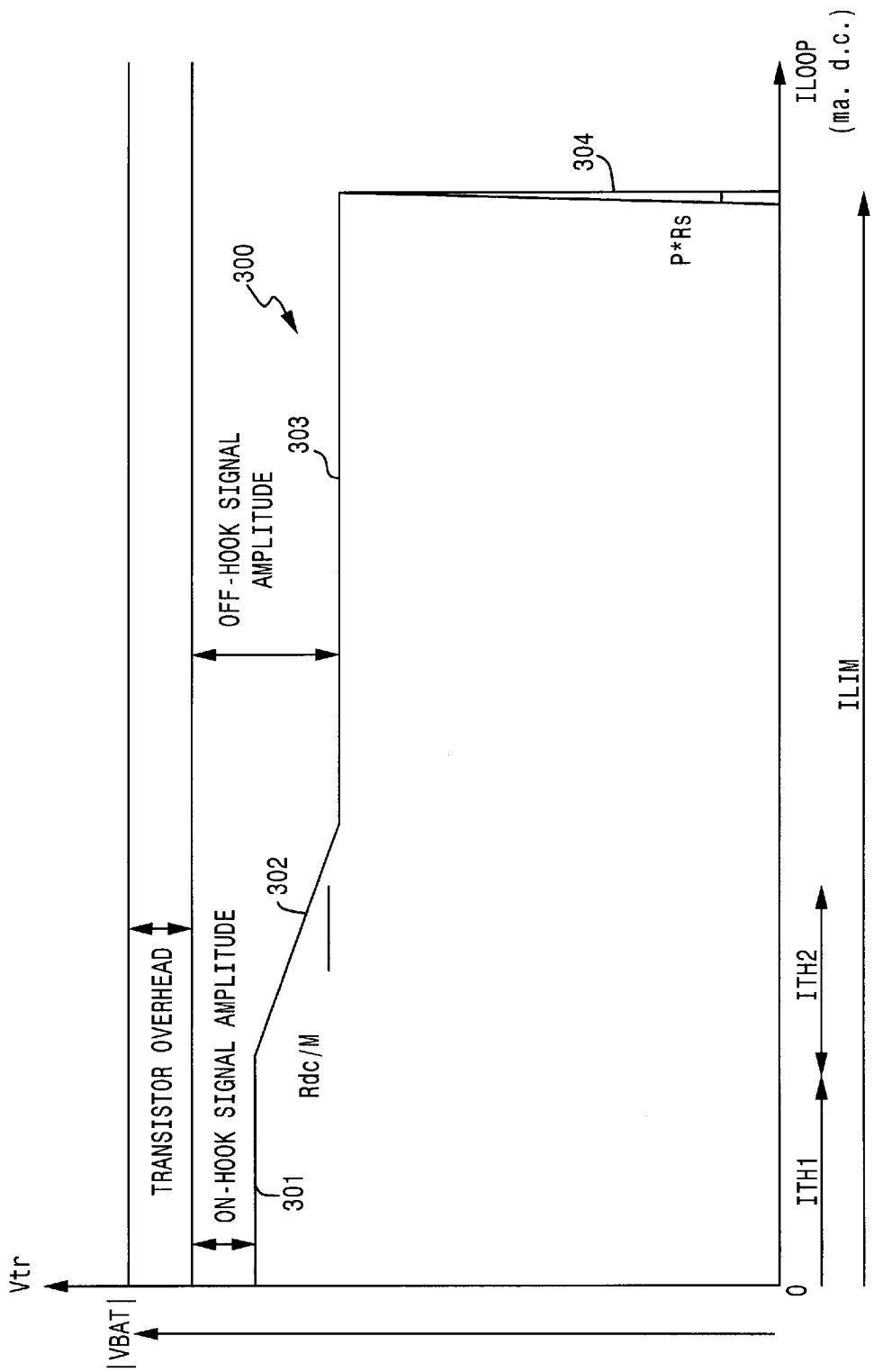
FIG. 2 graphically shows the relationship between wireline voltage differential Vtr and loop current ILdc provided by the DC biasing arrangement of FIG. 1, for respectively different modes of operation of a subscriber line interface circuit.

Referring now to FIG. 2, as pointed out above, as long as the loop current ILdc is less than the first threshold ITH1, I2=ITH1/1000 and, since ITH1<ITH1+ITH2<ILIM, I3=0. Therefore, recalling that Ia=Ib=|ILdc|/1000, then Vtr (for ILdc<ITH1)=|VBAT|−2.5V−20*RDC*ITH1/1000.

or

Vtr (for ILdc<ITH1)=|VBAT|−2.5V−RDC*ITH1/50; namely a constant voltage offset of −2.5V−RDC*ITH1/50 below the battery voltage VBAT, as shown by the zero slope segment 301 of the Vtr vs. loop current characteristic 300 of FIG. 2.

With a transistor overhead voltage of 2.5 volts, on-hook quiescent signal amplitude allowed is (RDC/50)*ITH1. Once the first threshold ITH1 is reached, then as long as the loop current ILdc is less than the second threshold, I2=Ia=|ILdc|/1000, and I3=0.

As a consequence, Vtr may be defined as:

Vtr (for ITH1<or=ILdc<or=ITH2)=|VBAT|−2.5V −RDC*ITH1/50.

Namely, Vtr has a non-zero slope from its value of Vtr=|VBAT|−2.5V−RDC*ILdc/50 at the first threshold point ITH1, as shown by the segment 302 of the Vtr vs. loop current characteristic 300 of FIG. 2.

Once the loop current reaches the second threshold point ITH2, I2 becomes equal to the sum of the first and second threshold currents, namely I2=ITH1/1000+ITH2/2000. Therefore, for a loop current in the transition segment 302 between the second threshold ITH2 and the upper limit ILIM, Vtr may be defined as:

Vtr (for ITH2<ILdc<ILIM)=|VBAT|−2.5V−RDC* (ITH1+ITH2)/50.

For an OFF-HOOK condition, the loop current ILdc exceeds the second threshold ITH2 within the (zero slope) segment 303 of the characteristic of FIG. 2, which provides an available signal amplitude swing of (ITH1+ITH2)*RDC/ 50.

When the loop current reaches the upper limit ILIM, I3=IB−ILIM/1000=ILdc/1000−ILIM/1000.

As a consequence, Vtr may be expressed as:

Vtr (for ILdc>or=ILIM)=|VBAT|−2.5V−RDC*(ITH1+ ITH2)/50−60M*(ILdc/1000 ILIM/1000), or Vtr (for ILdc>or=ILIM)=|VBAT|−2.5V−RDC*(ITH1+ ITH2)/50−60K*(ILdc−ILIM), as shown by the very steep sloped segment 304 of the characteristic 300 of FIG. 2.

As will be appreciated from the foregoing description, the DC biasing circuit of the invention controllably sets the differential DC voltage characteristic of a tip-ring loop driven by a subscriber line interface circuit in a manner that is optimized regardless of the mode of operation of the telephone circuit. During on-hook mode, the differential voltage across the wireline pair is set at a first constant value that is reduced from battery voltage by an amount that provides sufficient overhead for the operation of electronic circuit components and the amplitude of signals transported over said wireline pair. During a transition between on-hook mode and off-hook mode, the tip and ring DC drive voltages are controlled so as to vary the differential DC drive voltage in proportion to monitored DC loop current. During off-hook mode, the differential DC voltage is set at a second fixed value. If an upper DC loop current threshold is reached during off-hook mode, the differential DC voltage is sharply reduced from its second constant value. While we have shown and described an embodiment of the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A circuit arrangement for controlling a differential DC voltage across a telecommunication wireline pair comprising:

tip and ring drive amplifiers coupled in circuit with respective tip and ring portions of said telecommunication wireline pair, and being operative to apply a DC drive voltage to said telecommunication wireline pair so as to produce said differential DC voltage therefor; and a control circuit, coupled to monitor DC loop current flowing through said telecommunication wireline pair, and being operative to cause said tip and ring drive amplifiers to controllably vary said DC drive voltage such that said differential DC voltage has a prescribed relationship with DC loop current, wherein said control circuit is responsive to (a) a first current threshold associated with a transition in the operation of a phone from an on-hook, quiescent mode to an active off-hook call, (b) a second current threshold associated with the completion of the transition from an on-hook mode to an active off-hook mode, wherein said control circuit is operative to:
 i-cause said tip and ring drive amplifiers to establish said DC drive voltage at a first constant value during on-hook mode, in which DC loop current may vary between zero and a first DC loop current threshold value associated with a transition from on-hook mode toward off-hook mode, and
 ii-cause said tip and ring drive amplifiers to vary said DC drive voltage in proportion to monitored DC loop current, during a transition between on-hook mode and off-hook mode, and
 iii-cause said tip and ring drive amplifiers to establish said DC drive voltage at a second constant value for a variation in loop current during off-hook mode.

2. A circuit arrangement according to claim 1, wherein said first constant value is a value reduced from battery voltage by an amount that provides sufficient overhead for the operation of electronic circuit components and the amplitude of signals transported over said wireline pair during said on-hook mode.

3. A circuit arrangement according to claim 1, wherein said second constant value is a value reduced from battery voltage by an amount that provides sufficient overhead for the operation of electronic circuit components and the amplitude of signals transported over said wireline pair during said off-hook mode.

4. A circuit arrangement according to claim 1, wherein said control circuit is further operative to
 iv-cause said tip and ring drive amplifiers to reduce said DC drive voltage from said second constant value in response to said DC loop current reaching an upper limit threshold.

5. A circuit arrangement according to claim 1, wherein said control circuit is operative to inject controllable tip and ring drive currents through respective feedback resistors of said tip and ring amplifiers that establish said differential DC voltage in accordance with said prescribed relationship with DC loop current.

6. A method of establishing a differential DC voltage across a telecommunication wireline pair comprising the steps of:

(a) applying respective tip and ring DC drive voltages to tip and ring segments of said telecommunication wireline pair so as to produce said differential DC voltage thereacross; and (b) monitoring DC loop current flowing through said telecommunication wireline pair, and controlling said respective tip and ring DC drive voltages applied in step (a) such that said differential DC voltage has a characteristic that varies according to a prescribed relationship with said DC loop current, wherein the step of controlling the respective tip and ring DC drive voltages include the step of responding to (a) a first current threshold associated with a transition in the operation of a phone from an on-hook, quiescent mode to an active off-hook call, (b) c second current threshold associated with the completion of the transition from an on-hook mode to an active off-hook mode, and (c) a third current threshold associated with an upper end of an active off-hook mode, and wherein step (b) further comprises
 i-controlling said respective tip and ring DC drive voltages so that said differential DC voltage has a first constant value during on-hook mode, in which DC loop current may vary between zero and a first DC loop current threshold value associated with a transition from on-hook mode toward off-hook mode,
 ii-controlling said respective tin and ring DC drive voltages applied in step (a) so as to vary said differential DC drive voltage in proportion to monitored DC loop current, during a transition between on-hook mode and off-hook mode, and
 iii-establishing said differential DC voltage at a second constant value during off-hook mode.

7. A method according to claim 6, wherein said first constant value is a value reduced from battery voltage by an amount that provides sufficient overhead for the operation of electronic circuit components of a subscriber line circuit driving said wireline pair and the amplitude of signals transported over said wireline pair during said on-hook mode.

8. A method according to claim 6, wherein said second constant value is a value reduced from battery voltage by an amount that provides sufficient overhead for the operation of electronic circuit components of a subscriber line interface circuit driving said wireline pair and the amplitude of signals transported over said wireline pair during said off-hook mode.

9. A method according to claim 6, wherein step (b) further comprises
 iv-reducing said differential DC voltage from said second constant value in response to said DC loop current reaching an upper limit threshold.

* * * * *